US009616286B1

(12) United States Patent
Zamarripa

(10) Patent No.: US 9,616,286 B1
(45) Date of Patent: Apr. 11, 2017

(54) HAND EXERCISER

(71) Applicant: Michael Paul Zamarripa, Rancho Cordova, CA (US)

(72) Inventor: Michael Paul Zamarripa, Rancho Cordova, CA (US)

( * ) Notice: Subject to any disclaimer, the term of this patent is extended or adjusted under 35 U.S.C. 154(b) by 130 days.

(21) Appl. No.: 14/023,461

(22) Filed: Sep. 10, 2013

Related U.S. Application Data

(60) Provisional application No. 61/743,755, filed on Sep. 10, 2012.

(51) Int. Cl.
*A63B 23/16* (2006.01)
*A63B 21/02* (2006.01)

(52) U.S. Cl.
CPC .............. *A63B 23/16* (2013.01); *A63B 21/02* (2013.01)

(58) Field of Classification Search
CPC ................................. A63B 23/16; A63B 21/02
See application file for complete search history.

(56) References Cited

U.S. PATENT DOCUMENTS

| | | | | |
|---|---|---|---|---|
| 677,824 A * | 7/1901 | Troxler, Jr. | ..................... | 482/49 |
| 2,926,911 A * | 3/1960 | Reichel | ................. | A63B 23/16 482/128 |
| 3,622,152 A * | 11/1971 | Place | ............................. | 482/132 |
| 4,065,995 A * | 1/1978 | Greer | ..................... | A63B 23/16 84/465 |
| 4,711,445 A * | 12/1987 | Whitehead | ............. | A63B 23/16 482/49 |
| 5,466,202 A * | 11/1995 | Stern | ................ | A63B 21/00178 482/113 |
| 5,531,668 A * | 7/1996 | Mann | ................... | A61F 5/05816 482/113 |
| 5,593,369 A * | 1/1997 | Stern | ................ | A63B 21/00178 482/113 |
| 2003/0131710 A1* | 7/2003 | Goldiner | ......................... | 84/265 |
| 2010/0298100 A1* | 11/2010 | McVan | .......................... | 482/45 |

\* cited by examiner

*Primary Examiner* — Loan H Thanh
*Assistant Examiner* — Megan Anderson
(74) *Attorney, Agent, or Firm* — Richard A. Ryan

(57) ABSTRACT

A hand exerciser that is structured and arranged to strength the various muscle groups of the user's hand and to improve dexterity of the user's fingers and thumb. The hand exerciser comprises a flexible frame formed into an arc-shaped configuration having an outer surface and an inner surface. On the outer surface of the frame is a first platform at one end and a second platform at the opposite end. A resistance member, such as compressible foam, a bag or the like, is removably positioned against the inner surface inside the arc-shaped frame between the two platforms such that when the user presses the platforms between the fingers and thumb, the resistance member resists compression to exercise the hand. Rails and elongated members on the first platform assist with the improving strength and dexterity. Sensor pads, light and/or audio generators and a cell phone support apparatus can be utilized.

20 Claims, 4 Drawing Sheets

HAND EXERCISER

BACKGROUND OF THE INVENTION

A. Field of the Invention

The field of the present invention relates generally to hand exercisers. In particular, the present invention relates to manually-operated hand exercisers that are specially structured and arranged to develop and strengthen the user's fingers and thumb and to improve the user's finger and thumb dexterity. Even more particularly, the present invention relates to such hand exercisers that have one or more platforms and a compression resistance member material.

B. Background

Over the years, a multitude of hand exercisers have been provided to develop specific muscle groups within the hand of the user. These muscles groups are responsible for a wide range of hand movements that accomplish common everyday tasks and have been generally identified as finger-strength, grip-strength, wrist-strength, extension-strength and finger-hand dexterity. While individual hand exercisers typically focus on developing the specific muscle group the particular hand exerciser was designed to improve, very few hand exercisers are able to develop muscles that are outside the primary muscle group for which the exerciser was designed, leaving a need for a hand exerciser that can easily cross-train between the five muscle groups set forth above.

Many people utilize hand exercisers to improve their hand strength and to generally promote healthy strong hands, which can be crucial in a wide range of sport activities, including baseball, football, mixed martial arts, tennis, golf and the like. Presently, to fully develop all of the hand muscle groups requires the user to utilize multiple hand exercisers. As can be readily appreciated by persons skilled in the art, a hand exerciser that easily crosses between the rehabilitation, therapy and fitness fields can save the user time and money. In addition to sports and related activities, learning to play any musical instrument requires a level of development and strengthening from the fingers and thumb. A hand exerciser that continues this development and strengthening by targeting the down-time between practice on an instrument would be very beneficial.

In general, maintaining a well balance development between muscle groups of the hand can promote a life with healthy strong hands that can help avoid a growing number of hand problems that result from repetitive muscle movements. A person can develop their finger-strength by utilizing a prior art hand exerciser such as that disclosed in U.S. Pat. No. 5,147,256 to Silagy. This hand exerciser makes use of individual springy resistant buttons to isolate and exercise the user's fingers. This type of hand exerciser has been made in many different versions that generally use the same basic principles. However, if a person wants to develop his or her finger-hand dexterity with the same device, it would be ineffective due to the lack of smooth circular surfaces for the fingers and hand to freely develop these specific muscles groups. A person desiring to develop grip-strength may utilize a hand exerciser such as that disclosed in U.S. Pat. No. 7,121,983 to Trent, which is configured to strengthen the muscles that close the hand. This exerciser has a plurality of holes that the user's fingers extend through to adjust the hand gripping position as well as the resistance. But if a person desires to develop his or her finger-strength with this device, it would be difficult for the user's fingers to balance between the holes in a manner that allows him or her to gather enough resistance for the muscles of each finger to be developed.

Many jobs require a person to exert near-continuous compression and tension within the hand muscles, so much so that the muscles that open the hand may not get enough counter-balance exercise and, a result, these muscles can become somewhat weak. To prevent this from happening, a person can utilize a hand exerciser such as that described in U.S. Pat. No. 7,740,561 to Kupferman to develop his or her extension-strength. This hand exerciser provides different levels of tension to prevent the fingers and thumb from opening. However, when attempting to develop wrist-strength with the same device, the lack of any opposite resistance makes improving this muscle group of the user's hand substantially unachievable. A person wanting to develop wrist-strength can utilize a hand exerciser such as that described in U.S. Pat. No. 5,308,299 to Winston. This hand exerciser has a main resistance mechanism comprising a thick metal spring that offers the desired resistance and, as such, develops the muscle groups that affect the users' wrist strength. This type of hand exerciser has been around for many years and are available in a variety of resistance levels. However, if the user of the device desires to develop his or her grip-strength with the same device, the bulkiness of the handles generally make the device inadequate to develop these muscle groups.

For hundreds of years the Chinese people have used an assortment of Baoding Balls to develop finger-hand dexterity. A person would rotate them in the palm of the hand while using the fingers to direct the motion and speed of the balls. But if developing extension-strength with the same device, a person would find it to be impossible based on the lack of resistance needed to keep the fingers from opening from the palm of the hand.

Prior art hand exercisers are inherently incapable of cross-training from one muscle group to another in most situations. This leaves the option to choose between purchasing several different hand exercisers to develop specific muscle groups or sacrifice the development of certain muscle groups within the hand. Heretofore, no prior art hand exerciser has been able to fulfill the need for a hand exerciser that can easily cross-training between all muscle groups of the hand, including finger-strength, grip-strength, wrist-strength, extension-strength and finger-hand dexterity. As can be readily appreciated by persons skilled in the art, the use of separate hand exercisers for developing specific muscle groups is not necessarily the solution for all situations. The vicissitudes of modern hand exercisers require an improved hand exerciser that can easily cross-train between all muscle groups. Moreover, in prior art hand exercisers, cross-training from one muscle group to another with the same hand exerciser was found to be difficult or impossible in most situations. Nor has any prior art hand exerciser addressed the need for a hand exerciser that can easily cross-training between all muscle groups while developing and strengthening finger and thumb dexterity.

With the overwhelming public use of a wide variety of electronic hand-held devices, computer mise and keyboards and video game controllers in the 21st century, it is possible to see how often these muscle groups are called upon and why a hand exerciser that can easily cross-trains between the muscle groups of the hand would be beneficial. What is needed, therefore, is an improved hand exerciser that allows the user to easily and effectively cross-train between all of the muscle groups of his or her hand to develop and strength finger and thumb muscles and improve finger and thumb dexterity.

SUMMARY OF THE INVENTION

The improved hand exerciser of the present invention provides the benefits and solves the problems identified above. That is to say, the present invention discloses a hand exerciser which is specifically configured to allow the user thereof to effectively and efficiently exercise and develop the various muscle groups of his or her hand. The improved hand exerciser of the present invention is structured and arranged to cross-train between all of the muscle groups of the hand so as to develop and strength the user's finger and thumb muscles and to improve finger and thumb dexterity. In accordance with the present invention, there is provided a hand exerciser that is both uniquely designed and functional. An arc platform, attached at each end by finger and thumb gripping platforms, provides a point of contact for the fingers and thumb to grip the hand exerciser. A detachable resistance member that is made to be inserted within the inner side of the arc platform creates resistance between the finger and thumb gripping platforms. Within the perimeter of the finger and thumb gripping platforms, are half rounded vertical rails that provide spacing dividers for the fingers and thumb. The vertical rails are wrapped with a cord that is securely fastened to the finger and thumb gripping platforms, creating a texture surface for the user's fingers and thumb. An adjustable support strap fastens the user's hand to the hand exerciser without the aid of the finger and thumb gripping platforms. The hand exerciser develops and strengthens finger and thumb dexterity by creating resistance when compressed between the user's fingers and thumb.

In one embodiment of the present invention, the hand exerciser generally comprises a flexible frame formed in an arc-shaped configuration to define an outer surface and an inner surface, a support strap attached to a center section of the flexible frame, a first platform attached to or integral with the outer surface of the flexible frame at or near a first end thereof, a second platform attached to or integral with the outer surface of the flexible frame at or near a second end thereof, a plurality of rails on the outer surface of the first platform, a plurality of elongated members wrapped around the first frame and the rails and a resistance member removably attached to the inner surface of the flexible frame between the first and second platforms when the flexible frame is in the arc-shaped configuration. The flexible frame has a first end and a second end, with the center section being disposed therebetween. The flexible frame is sized and configured to be held in a hand of a user, with the first end of the flexible frame being generally disposed at the user's fingers, the second end of the flexible frame being generally disposed at the user's thumb and the center section disposed at the palm of the user's hand during use of the hand exerciser. The support strap is sized and configured to secure the hand exerciser to the hand of the user. Each of the first platform and the second platform have a proximal end and a distal end, with the first platform being accessible to the user's fingers and the second platform being accessible to the user's thumb when the center section is at the user's palm during use of the hand exerciser. In the preferred embodiment, each of the plurality of rails are disposed generally perpendicular to each of the proximal end and the distal end of the first platform and each of the plurality of elongated members generally extend across the width of the first platform over the plurality of rails. The resistance member is sized and configured to be received in the arc-shaped configuration of the flexible frame and to provide resistance to compression when the first platform and the second platform are squeezed between the user's fingers and the thumb. In the preferred embodiment, each of the plurality of rails have an upper surface that is disposed above the outer surface of the first platform and each of the elongated members are placed against the upper surfaces of the rails so as to dispose the elongated members in spaced apart relation to the outer surface of the first platform. Although the flexible frame can be configured to be fixed in its arc-shaped configuration, preferably the flexible frame is configured to move between a flat configuration wherein the flexible frame is generally planar and the arc-shaped configuration.

In an alternative embodiment of the present invention, the hand exerciser has one or more sensor pads on the outer surface of the first platform and/or the outer surface of the second platform, with the sensor pads being structured and arranged to be contacted by one or more of the fingers and/or the thumb of the hand to send a signal to an electronic unit having a microprocessor, with the electronic unit being connected to a wireless transmitter, an electronic device and/or an audio generator. In another alternative embodiment, the hand exerciser comprises a cell phone support apparatus that is structured and arranged to support a cell phone. In one configuration, the cell phone support apparatus comprises one or more cell phone holders that are configured to support the cell phone such that the user can still see the screen of the cell phone while using the hand exerciser.

Accordingly, the primary aspect of the present invention is to provide an improved hand exerciser that has the advantages discussed above and which overcomes the various disadvantages and limitations associated with prior art hand exercisers and like devices.

It is an important aspect of the present invention to provide a hand exerciser that is specifically configured to allow the user thereof to effectively and efficiently exercise and develop the various muscle groups of his or her hand.

It is also an important aspect of the present invention to provide a hand exerciser that is structured and arranged to cross-train between all of the muscle groups of the hand so as to develop and strength the user's finger and thumb muscles and to improve finger and thumb dexterity.

It is also an important aspect of the present invention to provide an improved hand exerciser having a flexible frame, one or more platforms attached to the flexible frame and a resistance member generally disposed between the two platforms to resist compression between the fingers and thumb of the user's hand. It is also an important aspect of the present invention to provide an improved hand exerciser that provides balanced development between the muscle groups of the hand.

It is also an important aspect of the present invention to provide an improved hand exerciser having a textured surface for the fingers and thumb to grip and to provide for optional types of finger and thumb gripping platforms.

It is also an important aspect of the present invention to provide an improved hand exerciser that can change the level of resistance between the finger and thumb gripping platforms and which can be utilized by both hands at the same time.

Another important aspect of the present invention is to provide a hand exerciser having an adjustable support strap for fastening the hand exerciser to the user's hand.

Yet another important aspect of the present invention is to provide a hand exerciser that can support a cell phone at an angled position, can illuminate and/or have interchangeable skins.

The above and other aspects of the present invention are explained in greater detail by reference to the attached figures and to the description of the preferred embodiments which follows. As set forth herein, the present invention resides in the novel features of form, construction, mode of operation and combination of the above presently described and understood by the claims.

BRIEF DESCRIPTION OF THE DRAWINGS

In the drawings which illustrate the preferred embodiments and the best modes presently contemplated for carrying out the present invention.

DETAILED DESCRIPTION OF THE PREFERRED EMBODIMENTS

With reference to the figures where like elements have been given like numerical designations to facilitate the reader's understanding of the present invention, the preferred embodiments of the present invention are set forth below. The enclosed text and drawings are merely illustrative of one or more preferred embodiments and, as such, disclose one or more different ways of configuring the present invention. Although specific components, materials, configurations and uses are illustrated, it should be understood that a number of variations to the components and to the configuration of those components described herein and in the accompanying figures can be made without changing the scope and function of the invention set forth herein. For instance, although the figures and description provided herein show certain shapes and configurations and describe certain materials for the components of the hand exerciser of the present invention, those skilled in the art will understand that this is merely for purposes of simplifying this disclosure and that the apparatus and system of the present invention are not so limited.

Figure 1:
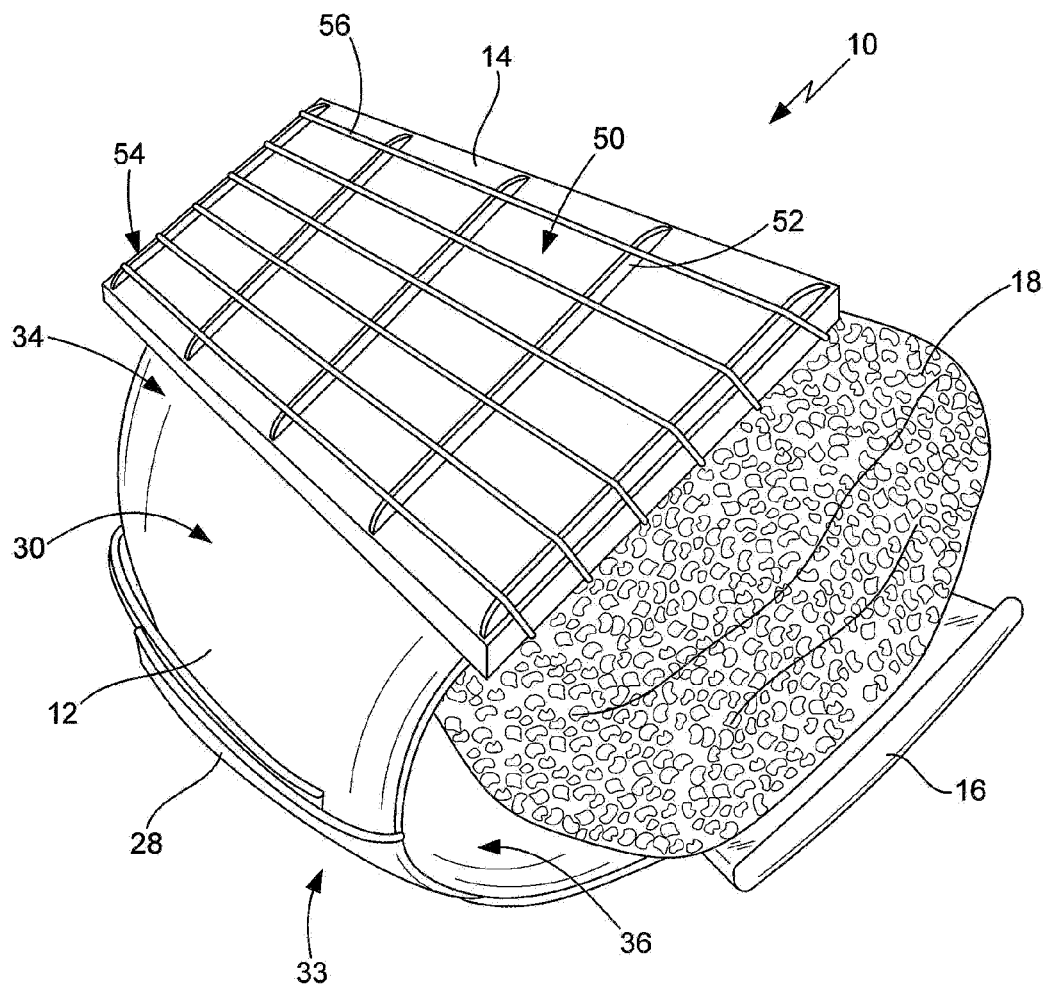
FIG. 1 is a right side perspective view of a hand exerciser that is configured according to one of the preferred embodiments of the present invention.
Figure 2:
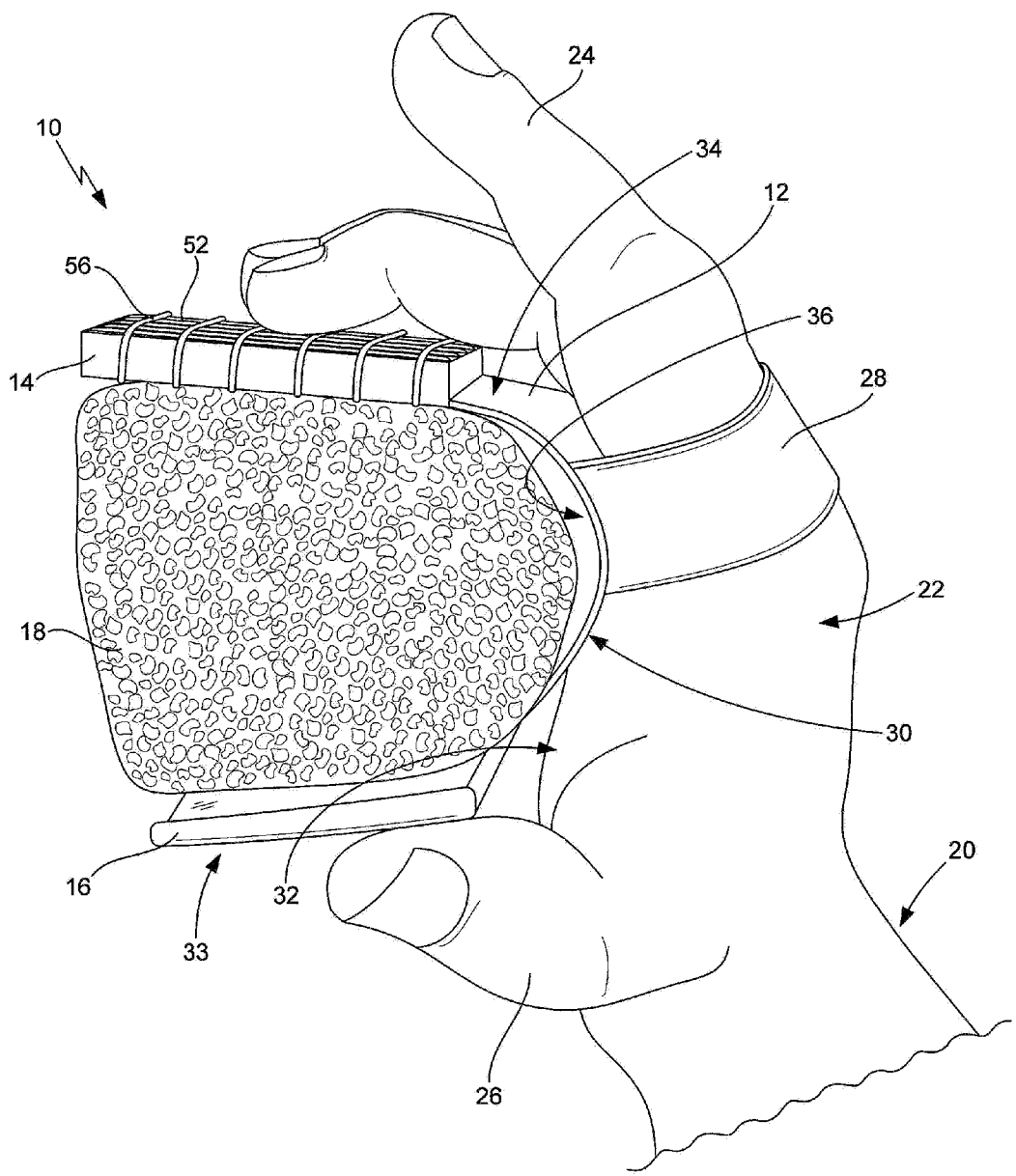
FIG. 2 is a left side view of the hand exerciser of FIG. 1 shown in use strapped to the user's hand.

A hand exerciser that is configured pursuant to one or more of the preferred embodiments of the present invention is shown generally as 10 in FIGS. 1-4. The hand exerciser 10 of the present invention generally comprises a flexible frame 12, a first platform 14 and a second platform 16 attached to or integral with the flexible frame 12 and one or more resistance members 18 that are disposed between the two platforms 14/16 and selected so as to provide resistance to the platforms 14/16 when they are pressed towards each other. In the embodiment shown in the figures, a single resistance member 18 is utilized. As set forth in more detail below, these components are cooperatively structured and arranged to allow the user 20 to position his or her hand 22 against a portion of the flexible frame 12 in a manner that facilitates pressing the user's fingers 24 and thumb 26 against the platforms 14/16 so the compression therefrom is resisted by the resistance member 18, as shown in the embodiment of FIGS. 1 and 2, to exercise the various muscle groups of the hand 22. In the preferred embodiment, the hand exerciser 10 of the present invention also comprises an adjustable support strap 28 attached to or integral with the flexible frame 12 to secure the hand exerciser 10 to the user's hand 22 without requiring the user 20 to hold onto the platforms 14/16. During use, a center section 30 of the flexible frame 12 is positioned against the palm 32 of the user's hand 22, as shown in FIG. 2. As set forth in more detail below, the hand exerciser 10 of the present invention strengthens the muscles of the user's hand 22, fingers 24 and thumb 26 and helps improve dexterity of the user's fingers 24 and thumb 26 by creating resistance when the resistance member 18 is compressed between the fingers 24 and thumb 26.

In a preferred embodiment, the flexible frame 12 is a single piece of flexible material that can be formed into a generally arc-shaped configuration, shown as 33 in FIGS. 1 and 2, defining an outer surface 34 and a inner surface 36, with the position of those surfaces 34/36 being referenced relative to each other when the flexible frame 12 is in its arc-shaped configuration 33 and the outer surface 34 is generally facing outwardly and the inner surface 36 is generally facing inwardly. In an alternative embodiment, the flexible frame 12 is made up of two or more frame sections that connect and work together to provide a structured, flexible frame 12 for the user's hand 22 when he or she is operating hand exerciser 10. Although a wide variety of materials can be utilized for the flexible frame 12, the material for flexible frame 12 needs to be generally flexible, compressible and bendable for compression by the fingers 24 and thumb 26 when utilized to exercise the hand 22. Because the palm 32 of the user's hand 22 is placed against the center section 30, it is preferred that at least the center section 30 either be made of or covered or coated with a material that can be comfortably held against the palm 32 of the hand 22 (i.e., generally smooth, non-abrasive). As will be readily appreciated by persons skilled in the art, the flexible frame 12 may be fabricated of metal, rubber, leather, plastic, wood or any other suitable material. Moreover, flexible frame 12 may be fixed in the generally arc-shaped configuration 33, as opposed to moving from a generally flat configuration, shown as 37 in FIG. 3, to the arc shaped configuration 33, so as to fixedly define the inner surface 34 and the outer surface 36 of the flexible frame 12.

Figure 3:
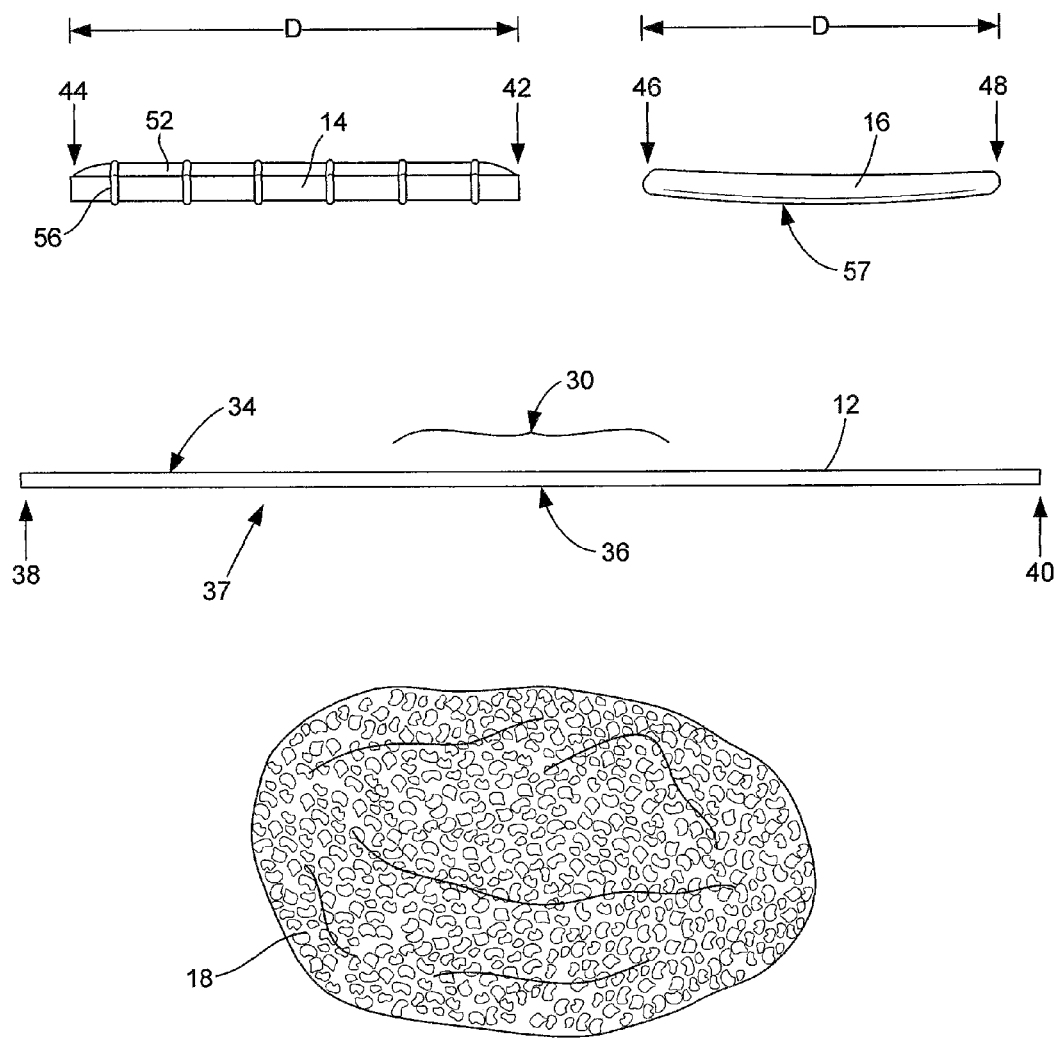
FIG. 3 is a partial exploded view showing the major components of the hand exerciser of FIG. 1.

In a preferred embodiment of the present invention, shown in the figures, the finger and thumb gripping platforms 14/16 are substantially flat for the user's hand 22 to grip and are permanently affixed to toward the ends 38/40 of the flexible frame 12 by gluing, nailing, welding or mechanically fastening in a manner well known to those skilled in the art that is consistent with the materials utilized for the flexible frame 12 and the platforms 14/16. Specifically, the first platform 14 is attached at or near the first end 38 of the flexible frame 12 and the second platform is attached at or near the second end 40 of the flexible frame 12, as best shown in FIG. 3. In an alternative embodiment, the platforms 14/16 can be integrally formed with the flexible frame 12. The finger and thumb gripping platforms 14/16 should be generally rigid and may be fabricated of wood, plastic, hard rubber, metal or a variety of other materials. In a preferred embodiment, the two finger and thumb gripping platforms 14/16 are generally rectangular-shaped and are each sized and configured with a width W to extend substantially across the width of the user's hand 22 at the fingers 24 and have a depth D which allows the fingers 24 to reach from the proximal end 42 of the first platform 14 to the distal end 44 thereof and the thumb 26 to extend generally from the proximal end 46 of the second platform 16 to the distal end 48 thereof, as best shown in FIGS. 2 and 3, with the terms proximal and distal referencing the relative position to the palm 32 of the user's hand 22 when he or she is using the hand exerciser 10.

Affixed to or integral with the outer surface 50 of the first platform 14 are a plurality of rails 52 that extend upward from the outer surface 50, as best shown in FIGS. 1-3. The rails 52 are spacing dividers for the fingers 24 and thumb 26 and may be fabricated of wood, plastic, metal, rubber or any other suitable material and are attached to the outer surface 50 of the first platform 15 by the use of adhesive, nails or mechanical fasteners. As will be readily appreciated by those skilled in the art, a wide variety of materials may be utilized for rails 52 and they may be attached by use of materials or devices appropriate for the materials used for first platform 14 and rails 52. Although the rails 52 may be of various length, preferably the rails 52 are sized and configured to fit within the perimeter of the first platform 14. As shown in the figures, in one of the preferred embodiments, there are five rails 52 that extend generally the entire depth D of the first platform 14. In a preferred embodiment, the rails 52 are generally evenly spaced apart from each other across the outer surface 50 of the first platform 14 so that each rail 52 is in spaced apart relation to its adjacent rail(s) 52. The upper surface 54 of the rails 52 are approximately one-eighth to one-fourth of an inch above the outer surface 50 of the first platform 14.

Wrapped around the width of the first platform 14 above the rails 52 are a plurality of elongated members 56, which are secured to the first platform 14 by the use of an adhesive, nails or mechanical fasteners, as may be appropriate for the materials used for the elongated members 56. In the embodiment, the hand exerciser 10 has six elongated members extending the full width W of first platform 14, as best shown in FIGS. 1 and 2. The elongated members 56 provide textured surfaces for the fingers 24 and thumb 26 to grip when operating the hand exerciser 10. The elongated members 56 may be fabricated of cloth, wire, leather, plastic, rubber or any other suitable material and may be of several lengths in sizes or may be on continual length. As shown in FIGS. 1 and 2, the elongated members 56 are placed over and across the upper surface 54 of the rails 52 such that each of the elongated members 56 are placed in spaced apart relation to the outer surface 50 of the first platform 14. Typically, the elongated members 56 will lay firmly against the outer surface 57 of the second platform 16.

In a preferred embodiment, the resistance member 18 is removably attached to the inner surface 36 of the flexible frame 12 so it can be inserted into and held in place in the space formed by the arch-shaped configuration 33 of the flexible frame 12 between the two platforms 14/16 to provide resistance when the user 20 presses his or her fingers 24 and thumb 26 against the platforms 14/16. In an alternative embodiment, the resistance member 18 is fixedly attached to the inner surface 36 of the flexible frame 12 or, depending on the materials, integral with the flexible frame 12. The resistance member 18, which is sized and configured to provide the desired resistance, may be fabricated of foamed plastic, electronically mechanized, metal springs, fluid (air or liquid) filled bags or any other device suitable to create resistance for the user's hand 22 when he or she operates the hand exerciser 10. The resistance member 18 can be removably attached to the inner surface 36 of flexible frame 12 using Velcro®, snaps, ties, buttons or other connectors suitable for the materials utilized for the flexible frame 12 and resistance member 18.

In the embodiment shown in the figures, support strap 28 is secured to or integral with the center section 30 of the flexible frame 12. Support strap 28 may be fabricated of elastic cloth, expandable rubber, stretchable plastic, rubber or any other suitable material and be of sufficient length to securely go around the user's hand 22. In one embodiment, the support strap 28 is adjustably attached to the flexible frame 12 by Velcro® hook and loop fasteners, buttons, zippers, laces, buckles, or the like and structured and arrange to connect the hand exerciser 10 to the user's hand 22 without the need for the finger and thumb gripping platforms 14/16 to attach to the user 20. In use, the support strap 28 will go around the back of the user's hand 22, typically at the fingers 24, as shown in FIG. 2.

As set forth above, the hand exerciser 10 adjustably fastens to the hand 22 by use of the support strap 22. Attached at the ends of the flexible frame 12 are the finger and thumb gripping platforms 14/16, which provide a point of contact for the fingers 24 and thumb 26 to grip the hand exerciser 10. The rails 52 are affixed to the finger and thumb gripping platforms 14/16 to provide spacing dividers for the fingers 24 and thumb 26 of hand 22. The elongated members 56 are horizontally wrapped around the vertical rails 52 and are secured to the finger and thumb gripping platforms 14/16. The elongated members 56 provide the fingers 24 and thumb 26 a textured surface for gripping the hand exerciser 10. A detachable resistance member 18 is shown against the inner surface 36 of the flexible frame 12, creating resistance between the two finger and thumb gripping platforms 14/16 when the user 20 compresses them toward each other.

Figure 4:
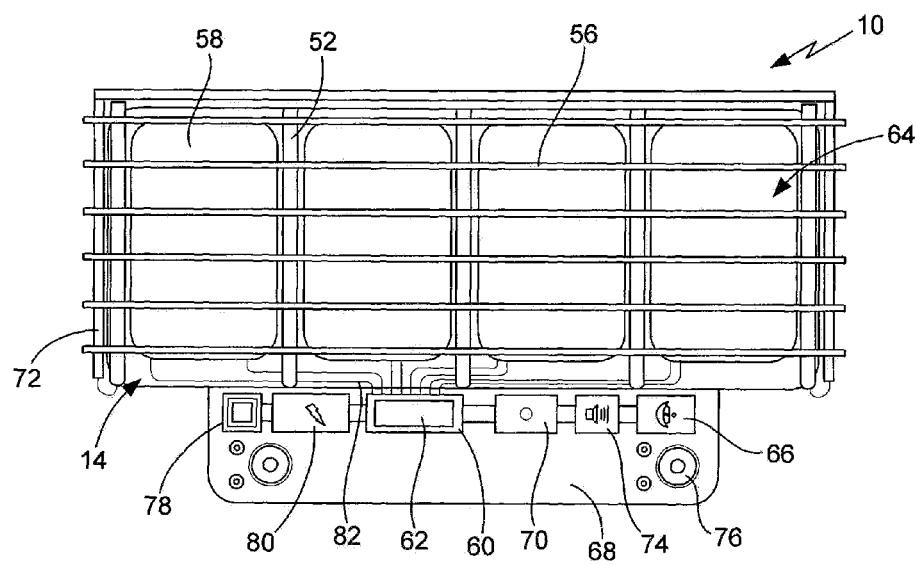
FIG. 4 is a top plan view of a first alternative embodiment of the hand exerciser of FIG. 1 wherein the finger and thumb gripping platform comprises a plurality of sensor pads electrically connected to a electronic unit having a microprocessor to receive signals from the sensor pads and transmit a signal to an attached electronic device.

An alternative embodiment of the hand exerciser 10 of the present invention is shown in FIG. 4. In this embodiment the finger and thumb gripping platforms 14/16 comprise a plurality of sensor pads 58 that relay data impulses to an electronic unit 60 having a microprocessor 62 which captures and processes the data impulses from the sensor pads 58. As shown in the embodiment of FIG. 4, the sensor pads 58 are located between pairs of rails 52, resulting in four such sensor pads 58 in the embodiment shown in the figures. The sensor pads 58 are accessed by the user's fingers 24 contacting the sensor pads 58 in the open spaces 64 defined between pairs of rails 52 and pairs of elongated members 56. Contact by a finger 24 at each open space 64 against sensor pad 58 produces a particular, pre-defined data impulse. If desired, a separate sensor pad 58 can be positioned in each open space 64. The data impulses from the sensor pad 58 can be transmitted by a wireless transmitter 66 to one or more electronic devices 68 associated with the electronic unit 60. In one embodiment, the electronic device 68 comprises a light generator 70 that produces light and transmits the light through the light tubing 72 along the edges of the first platform 14. If desired, the light in light tubing 72 can flash and/or change color based on the data impulses from the sensor pads 58. In another embodiment, the electronic device 68 comprises an audio generator 74 that produces sound and transmits the sound to one or more audio speakers 76. If desired, the sound produced by the audio generator 74 can change as a result of the data impulses resulting from contact against the sensor pads 58. A charging port 78 can be provided to allow the user 20 to recharge the one or more batteries 80 associated with the electronic unit 60 and/or electronic device 68. Typically, wiring 82 interconnects the elements of the finger and thumb gripping platforms 14/16 in way that can produce specific desired results.

Figure 5:
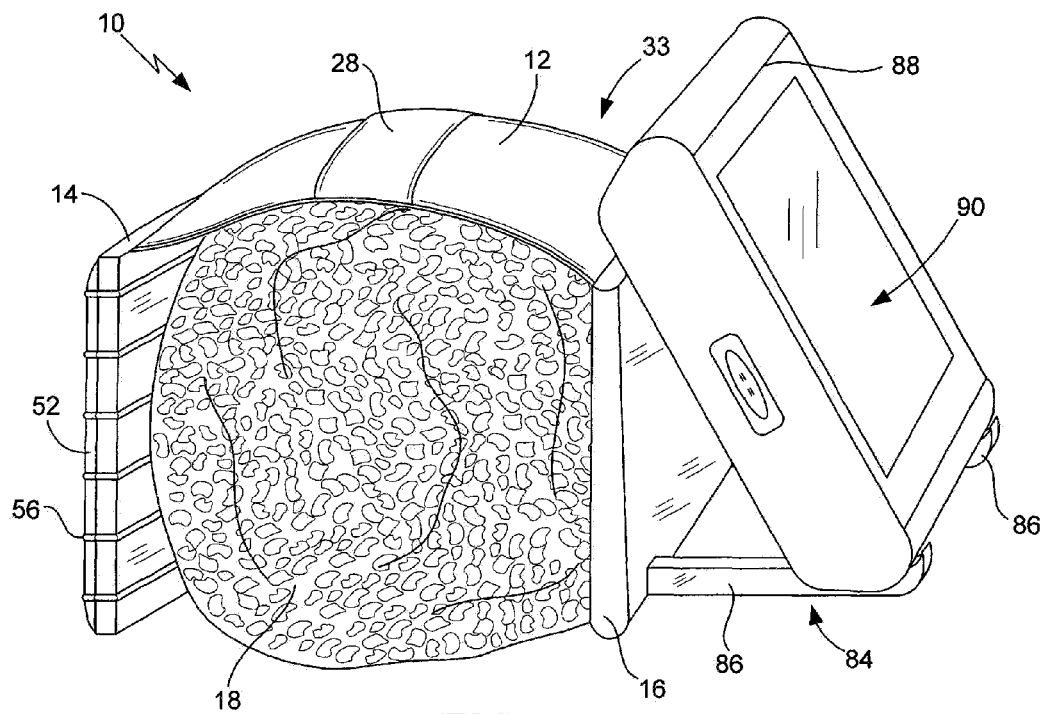
FIG. 5 is a left side view of a second alternative embodiment of the hand exerciser of FIG. 1 shown with an optional cell phone support apparatus having a cell phone supported thereby.

A second alternative embodiment of the hand exerciser 10 of the present invention is shown in FIG. 5, with the back of the arc-shaped configuration 33 of the flexible frame 12 disposed in a generally upward position with the finger and thumb gripping platforms 14/16 standing upward. The resistance member 18 is shown between the two platforms 14/16 against the inner surface 36 of the flexible frame 12 and the support strap 28 is attached to the flexible frame 12. The elongated members 56 are secured around first platform 14. This embodiment includes a cell phone support apparatus 84 comprising a pair of cell phone holders 86 attached to and positioned underneath one of the finger and thumb gripping platforms 14/16 and the resistance member 18. In FIG. 5, the cell phone holders 86 are attached to the second platform 16. The cell phone holders 86 of the cell phone support apparatus 84 are structured and arranged to support and stabilize a cell phone 88 on the hand exerciser 10 in a generally angled position for operation of the cell phone 88 and improved viewing of the screen 90 thereof. As will be readily appreciated and understood by those skilled in the art, cell phone support apparatus 84 must be configured such that the cell phone 88 will not fall away from the hand exerciser 10 when the user 20 is exercising his or her hand 22.

In summary, it can be seen that what is provided is a hand exerciser 10 which is unique in design and function. The hand exerciser 10 is shaped and configured to be held and compressed between the user's fingers 24 and thumb 26. An arc-shaped flexible frame 12 supports a pair of platforms 14/16 working together to provide a structured frame for the hand exerciser 10. The first platform 14 is attached to the first end 38 of the flexible frame 12 and the second platform 16 is attached to the second end of the flexible frame 12 to provide a points of contact for the user's fingers 24 and thumb 26 to grip the hand exerciser 10. A detachable resistance member 18 is inserted between the two platforms 14/16 against the inner surface 36 of the arc-shaped configuration 33 of the flexible frame 12 to provide the desired resistance between the two platforms 14/16. Within the perimeter of the first platform 14 are a plurality of half rounded vertical rails 52 that provide spacing dividers for the fingers 24 and thumb 26 of the user's hand 22. A plurality of elongated members 56 are wrapped around rails 52 and securely fastened to the first platforms 14. The elongated members 56 provides a texture surface for the fingers 24 and thumb 26 to grip the hand exerciser 10. The adjustable support strap 28, which is attached to the flexible frame 12, secures the hand exerciser 10 to the user's hand 22 without the aid of the finger and thumb gripping platforms 14/16.

In use, the user 20 places the resistance member 18 against the inner surface 36 of the flexible frame 12 between the two platforms 14/16. Because the resistance member 18 is removably secured to the flexible frame 12, the user 20 can select the amount of resistance that he or she desires, thereby allowing the user 20 to increase the resistance over time by selecting a more resistant, less compressible resistance member 18 as his or her hand muscles strengthen. Using the support strap 28, the user 20 secures the hand exerciser 10 to his or her hand 22, typically with the first platform 14 positioned at the fingers 24 and the second platform 16 positioned at the thumb 26, as shown in FIG. 2. If desired, the position of the platforms 14/16 can be reversed. The user 20 then squeezes the platforms 14/16 between his or her fingers 24 and thumb 26 to compress the resistance member 18 between the two platforms 14/16. The squeezing by the user 20 is resisted by the strength of the resistance member 18. The user will compress the resistance member 18 while moving his or her fingers 24 into different positions on the first platform 14, such as from one open space 64 to another and/or on top of the elongated members 56 themselves, using the feel of the rails 52 and elongated members 56 to guide his or her movement. The resistance provided by the hand exerciser 10 of the present invention when the user 20 utilizes his or her fingers 24 and thumb 26 to compress the platforms 14/16 against the resistance member 18 strengthens the various muscles of the hand 22 and improves finger and thumb dexterity. The increase in strength and improvement in dexterity will be benefit the user 20 with regard to many different types of activities, including athletic/sporting activities, playing a variety of musical instruments, use of computer keyboards and mice and the like.

While there are shown and described herein a specific form of the invention, it will be readily apparent to those skilled in the art that the invention is not so limited, but is susceptible to various modifications and rearrangements in design and materials without departing from the spirit and scope of the invention. In particular, it should be noted that the present invention is subject to modification with regard to any dimensional relationships set forth herein and modifications in assembly, materials, size, shape and use. For instance, there are numerous components described herein that can be replaced with equivalent functioning components to accomplish the objectives of the present invention.

What is claimed is:

1. A hand exerciser, comprising:
a flexible frame having a first end, a second end and a center section disposed therebetween, said flexible frame in an arc-shaped configuration so as to define an outer surface and an inner surface, said flexible frame sized and configured to be held in a hand of a user having fingers, a thumb and a palm;
a support strap attached to said flexible frame, said support strap sized and configured to secure said hand exerciser to the hand of the user with said center section at the palm of the hand when the fingers are position toward said first end of said flexible frame and the thumb is positioned toward said second end of said flexible frame to hold said hand exerciser on the hand without requiring use of the fingers and the thumb;
a first platform attached to or integral with said outer surface of said flexible frame at or near said first end thereof, said first platform having a proximal end and a distal end, said first platform defining a raised outer surface in spaced apart relation to said outer surface of said flexible frame at said first end thereof;
a second platform attached to or integral with said outer surface of said flexible frame at or near said second end thereof, said second platform having a proximal end and a distal end, said second platform defining a raised outer surface in spaced apart relation to said outer surface of said flexible frame at said second end thereof; and
one or more resistance members positioned at said inner surface of said flexible frame between said first platform and said second platform, said resistance members being sized and configured to provide resistance to compression when said first platform and said second platform are squeezed toward each other in the user's hand between the fingers on the first platform and the thumb on the second platform.

2. The hand exerciser of claim 1 further comprising a plurality of rails and a plurality of elongated members on said outer surface of said first platform.

3. The hand exercise of claim 2, wherein each of said plurality of rails are disposed generally perpendicular to each of said proximal end and said distal end of said first platform and each of said plurality of elongated members generally extending the width of said first platform over said plurality of rails.

4. The hand exercise of claim 3, wherein each of said plurality of rails substantially extends from said proximal end to said distal end of said first platform.

5. The hand exerciser of claim 3, wherein each of said plurality of rails have an upper surface disposed above said outer surface of said first platform and each of said elongated members are placed against said upper surfaces of said rails so as to dispose said elongated members in spaced apart relation to said outer surface of said first platform.

6. The hand exerciser of claim 3, wherein said elongated members are wrapped around the width of said first platform so as to also extend across and be in abutting relation to an outer surface of said second platform.

7. The hand exerciser of claim 1 further comprising one or more sensor pads on at least one of said outer surface of said first platform and said outer surface of said second platform, said sensor pads structured and arranged to be contacted by one or more of the fingers and/or the thumb of the hand.

8. The hand exerciser of claim 7, wherein said sensor pads are connected to an electronic unit having a microprocessor.

9. The hand exerciser of claim 8, wherein said electronic unit connected to at least one of a wireless transmitter, an electronic device and an audio generator.

10. The hand exerciser of claim 1, wherein said flexible frame is configured to move between a flat configuration wherein said flexible frame is generally planar and said arc-shaped configuration.

11. The hand exerciser of claim 1, wherein said resistance member is removably attached to said inner surface of said flexible frame.

12. The hand exerciser of claim 1, wherein said flexible frame is structured and arranged such that said center section thereof is between said proximal end of said first platform and said proximal end of said second platform and configured to be received against the palm of the hand when said hand exerciser is in use by the user.

13. The hand exerciser of claim 1 further comprising a cell phone support apparatus structured and arranged to support a cell phone.

14. A hand exerciser, comprising:
a flexible frame having a first end, a second end and a center section disposed therebetween, said flexible frame in an arc-shaped configuration so as to define an outer surface and an inner surface, said flexible frame sized and configured to be held in a hand of a user having fingers, a thumb and a palm;
a support strap attached to said flexible frame, said support strap sized and configured to secure said hand exerciser to the hand of the user with said center section at the palm of the hand when the fingers are position toward said first end of said flexible frame and the thumb is positioned toward said second end of said flexible frame to hold said hand exerciser on the hand without requiring use of the fingers and the thumb;
a first platform attached to or integral with said outer surface of said flexible frame at or near said first end thereof, said first platform having a proximal end and a distal end, said first platform defining a raised outer surface in spaced apart relation to said outer surface of said flexible frame at said first end thereof;
a second platform attached to or integral with said outer surface of said flexible frame at or near said second end thereof, said second platform having a proximal end and a distal end, said second platform defining a raised outer surface in spaced apart relation to said outer surface of said flexible frame at said second end thereof;
a plurality of rails on said outer surface of said first platform, each of said plurality of rails being disposed generally perpendicular to each of said proximal end and said distal end of said first platform;
a plurality of elongated members on said first platform, each of said plurality of elongated members generally extending the width of said first platform over said plurality of rails; and
a resistance member removably attached to said inner surface of said flexible frame between said first platform and said second platform, said resistance member being selected so as to provide resistance to compression when said first platform and said second platform are squeezed towards each other in the user's hand between the fingers on the first platform and the thumb on the second platform.

15. The hand exerciser of claim 14 further comprising one or more sensor pads on at least one of said outer surface of said first platform and said outer surface of said second platform, said sensor pads structured and arranged to be contacted by one or more of the fingers and/or the thumb of the hand and transmit data impulses to an electronic unit having a microprocessor.

16. The hand exerciser of claim 15, wherein said electronic unit connected to at least one of a wireless transmitter, an electronic device and an audio generator.

17. The hand exerciser of claim 14, wherein each of said plurality of rails have an upper surface disposed above said outer surface of said first platform and each of said elongated members are placed against said upper surfaces of said rails so as to dispose said elongated members in spaced apart relation to said outer surface of said first platform.

18. The hand exerciser of claim 14, wherein said flexible frame is structured and arranged such that said center section thereof is between said proximal end of said first platform and said proximal end of said second platform and configured to be received against the palm of the hand when said hand exerciser is in use by the user.

19. The hand exerciser of claim 14 further comprising a cell phone support apparatus structured and arranged to support a cell phone.

20. A hand exerciser, comprising:
a flexible frame having a first end, a second end and a center section disposed therebetween, said flexible frame in an arc-shaped configuration so as to define an outer surface and an inner surface, said flexible frame sized and configured to be held in a hand of a user having fingers, a thumb and a palm, with said first end of said flexible frame generally disposed at the fingers of the hand, the second end of said flexible frame generally disposed at the thumb of the hand and said center section disposed at the palm of the hand during use of said hand exerciser;
a support strap attached to said flexible frame, said support strap sized and configured to secure said hand exerciser to the hand of the user with said center section at the palm of the hand when the fingers are position toward said first end of said flexible frame and the thumb is positioned toward said second end of said flexible frame to hold said hand exerciser on the hand without requiring use of the fingers and the thumb;
a first platform attached to or integral with said outer surface of said flexible frame at or near said first end thereof so as to be accessible to the fingers of the hand when said hand exerciser is secured to the hand, said first platform having a proximal end and a distal end, said first platform defining a raised outer surface in spaced apart relation to said outer surface of said flexible frame at said first end thereof;

a second platform attached to or integral with said outer surface of said flexible frame at or near said second end thereof so as to be accessible to the thumb of the hand when said hand exerciser is secured to the hand, said second platform having a proximal end and a distal end, said second platform defining a raised outer surface in spaced apart relation to said outer surface of said flexible frame at said second end thereof;

a plurality of rails on said outer surface of said first platform, each of said plurality of rails being disposed generally perpendicular to each of said proximal end and said distal end of said first platform;

a plurality of elongated members on said first platform, each of said plurality of elongated members generally extending the width of said first platform over said plurality of rails; and one or more resistance members positioned at said inner surface of said arc-shaped configuration of said flexible frame between said first platform and said second platform when said flexible frame is disposed in said arc-shaped configuration, each of said resistance members being sized and configured to be received in said arc-shaped configuration of said flexible frame and to provide resistance to compression when said first platform and said second platform are squeezed in the user's hand between the fingers on the first platform and the thumb on the second platform.

* * * * *